B. ACKERMAN.
Preparation of Fertilizers.
No. 158,772.            Patented Jan. 19, 1875.
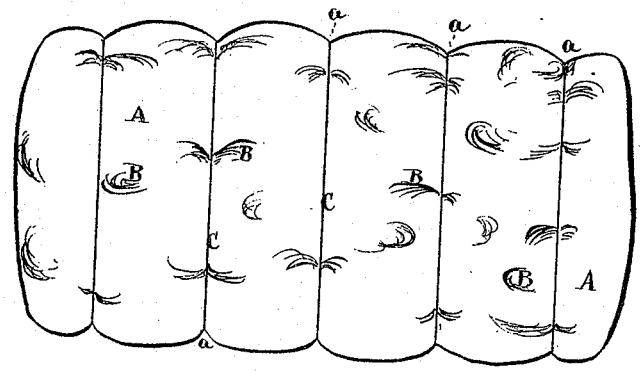
Witnesses:
M. A. Van Namee
Inventor:
Bernard Ackerman
by his attorney

UNITED STATES PATENT OFFICE.

BERNARD ACKERMAN, OF NEW YORK, N. Y.

IMPROVEMENT IN THE PREPARATION OF FERTILIZERS.

Specification forming part of Letters Patent No. 158,772, dated January 19, 1875; application filed December 14, 1874.

*To all whom it may concern:*

Be it known that I, BERNARD ACKERMAN, of New York city, in the State of New York, have invented certain Improvements Relating to the Preparation of Fertilizers, of which the following is a specification:

I propose to prepare the stable-manure in city stables by a cheap and expeditious process of forming in bales by simple compression and banding.

The importance to the community of more economically utilizing the immense amount of fertilizing principles wasted, or nearly wasted, in cities has been long appreciated. Expensive processes of forming in bricks have been long employed in countries where labor is cheap, and analogous methods have been proposed and patented in this country, but none have come into general use, and stable-manure continues to be treated in loose masses, offending the senses, while losing much of its value in its costly and disagreeable transportation. I esteem the straw a valuable element, and make it available in aiding to hold the mass together, serving as an absorbent for liquid portions, and, by its silicious qualities, contributing to the value of the fertilizer. I have discovered that, after sufficiently-powerful compression and tying with stout wires or analogous bands, the bales of mingled manure and straw dry rapidly upon the outside, while the densely-compacted interior maintains a fixed condition, without tendency to heat, and the whole mass may be handled and transported with greatly-increased convenience, and without losing its ammonia or being more than slightly offensive. The material may be pitched fresh from the stalls into the rectangular box of the press and baled without requiring but little time or skill. The bales maintain an approximately-rectangular form, with deep grooves formed by the presence of the bands. These grooves allow a sufficient circulation of air after the bales are piled tightly on a wagon or canal-boat.

In what I consider the best means of carrying out the invention, a suitable press, of strong but cheap construction, stands on or below the stable-floor, and the bales are secured by bands of about No. 8 iron wire, with the ends engaged by hooks or other strong fastening.

The accompanying drawing forms a part of this specification.

A is the excrementary matter or manure proper. B is the straw or litter, and C the confining-bands. As the pressure of the press is relaxed after the bands are confined, the material naturally swells out in the endeavor to regain its former bulk. This causes more or less deep grooves over each band, as indicated by *a*. The bale retains an approximately squared form, but with the sides more or less swelled, and with as many grooves *a* extending around as there are bands C on the bale.

The compression should be such that the finished bales occupy only about one-fourth of the ordinary bulk of the material. They may be stored near the press or at other convenient points in the stable, and removed after longer or shorter intervals at convenience.

The same class of cheap labor may be employed as heretofore, both in the stable and in the transportation of the material, but, by reason of the improvement, it can be transported with greater convenience and economy. The ordinary rough laborers in the stable have sufficient skill to operate the press and to apply the bands.

The rapidity with which successive charges can be baled and compactly stowed away with ordinary stable help makes it easy to prevent nearly all the disengagement of ammonia, which is so destructive to the varnish of carriages.

The invention allows the ordinary dung-pit to be dispensed with. It avoids the necessity of the array of filthy carts ordinarily employed, and the dropping and scattering of the material over the floors and sidewalks. The removal may, if preferred, be performed in similar carts and by the same men, but the whole operation may be conducted without littering the ground or offending the neighborhood.

The area on which the fertilizers from cities may be economically spread is, by my invention, very greatly enlarged, my mode of preparing it being free from the objections which have prevented the introduction of other modes of compacting manures.

I do not claim anything shown or described in the patent granted to H. C. Babcock, dated July 2, 1872, No. 128,454; but

I claim as my invention—

The within-described banded manures, composed of the excrementary matters A and straw or litter D, confined in an approximately-rectangular form by the bands C, so as to present the ventilating-grooves a, substantially as and for the purposes herein specified.

In testimony whereof I have hereunto set my hand this 10th day of December, 1874, in in the presence of two subscribing witnesses.

BERNARD ACKERMAN.

Witnesses:
WM. C. DEY,
E. VOLKMANN.